May 4, 1943.  C. K. STILLWAGON  2,318,112
UNION
Filed Nov. 7, 1941
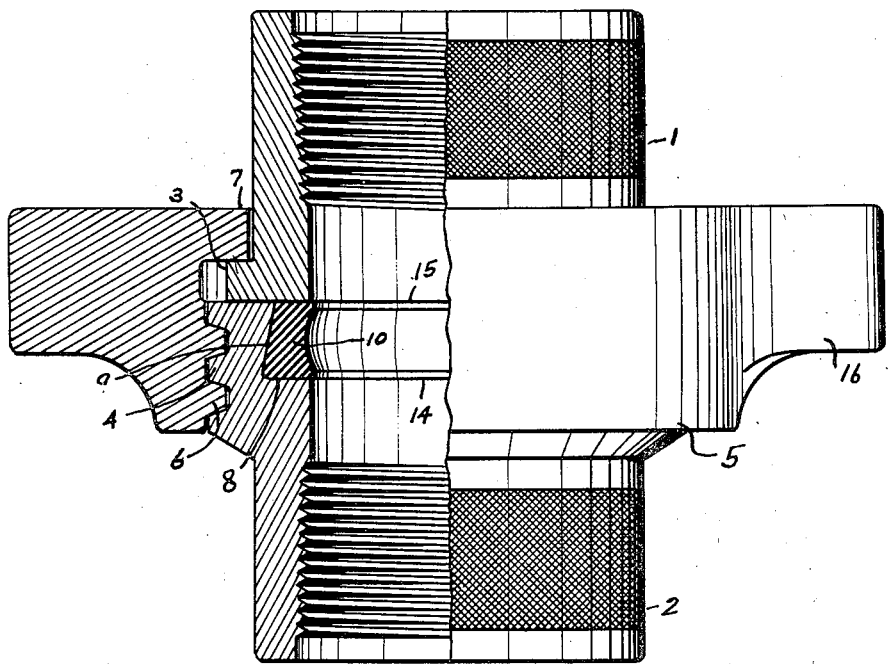
Fig. 1.
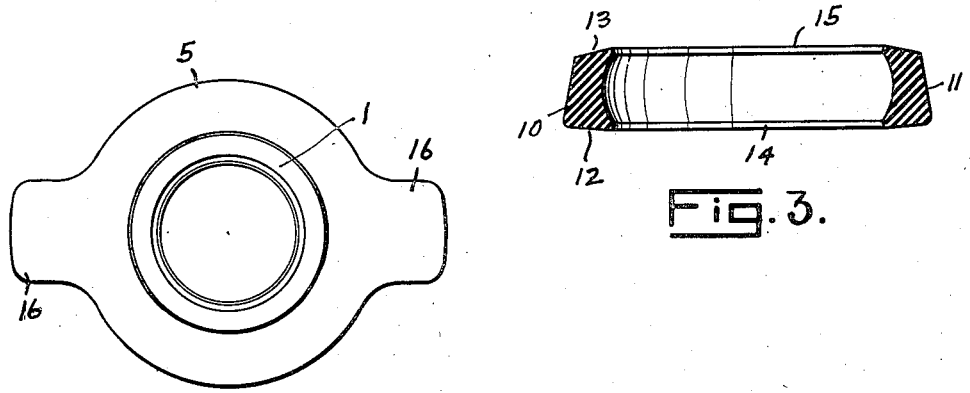
Fig. 2.
Fig. 3.
Inventor
Crawford K. Stillwagon
By
E. V. Hardway
Attorney Patented May 4, 1943

2,318,112

UNITED STATES PATENT OFFICE 2,318,112

UNION

Crawford K. Stillwagon, Houston, Tex.

Application November 7, 1941, Serial No. 418,124

2 Claims. (Cl. 285—120)

This invention relates to a union.

An object of the invention is to provide a union whereby sections of pipe or tubing may be quickly connected or disconnected.

Another object of the invention is to provide a union of the character described which is of such construction that it may be quickly connected or disconnected and when connected a leak proof joint between the coupling members will be formed.

It is a further object of the invention to provide in a union of the character described a novel type of gasket which breaks, or covers, the joint between the members, the gasket being of such formation that the fluid flowing through the line will not displace the gasket but the pressure of the fluid will tend to hold the gasket the more firmly seated in the internal annular seat provided to receive it.

With the above and other objects in view the invention has particular relation to certain novel features of construction, arrangement of parts and use, an example of which is given in this specification and illustrated in the accompanying drawing, wherein:

Figure 1 shows a side view of the union partly in section.

Figure 2 shows an end view, and

Figure 3 shows a cross-sectional view of the gasket employed.

Referring now more particularly to the drawing wherein like numerals of reference designate the same parts in each of the figures, the numerals 1 and 2 designate, respectively, the coupling members of the union whose outer ends are internally threaded for the connection of the adjacent sections of pipe thereto.

The inner end of the coupling member 1 is formed with an external annular flange 3 and the abutting end of the coupling member 2 is outwardly thickened and formed with coarse external threads 4. The abutting ends of the coupling members 1 and 2 are formed with plane faces which fit closely together as clearly shown in Figure 1. There is a clamp nut 5 having coarse internal threads 6 adapted to intermesh with the threads 4 and also having an inwardly extended end flange 7 engageable with the flange 3, when the threads are screwed home to clamp the facing ends of the coupling members in abutting relation.

The inside diameter of the threads 6 is slightly larger than the outside diameter of the flange 3 so that the clamp nut 5 may be fitted over the coupling member 1 and the threads 6 screwed into the threads 4.

The inner end of the coupling member 2 has an inside countersunk portion presenting the wall 8 which is approximately parallel with the opposing end of the coupling member 1 and also presenting an outer wall 9 which tapers, or converges, toward the inner end of the coupling member 2 at approximately a ten degree angle to the axis of the union. An annular inside groove is thus formed to receive a gasket 10.

This gasket is formed of yieldable material such as neoprene or other similar material. Its outer face 11 is tapered, relative to its axis so as to fit closely against the wall 9 of said groove. The end faces 12 and 13 of the gasket converge outwardly, the former at approximately a two degree angle and the latter at approximately a ten degree angle with respect to the axis of the gasket. These angles, of course, may be varied.

Preferably, the inner side of the gasket is concaved from one end face to the other thus providing annular end lips 14, 15 which extend inwardly. The inner side of the gasket is somewhat wider than the width of the groove in which it is designed to fit so that when the coupling member 1 is fitted into position against the facing end of the coupling member 2 and the clamp nut 5 is screwed home the gasket will conform its shape to the shape of said groove as shown in Figure 1 and will be held in said groove under compression with the lip portions fitting tightly against the opposing sides of the groove.

The fluid flowing under pressure through the line will therefore tend to press the gasket more securely in place and will tend to spread the lips into close sealing relationship with the opposing sides of the groove. If the gasket were made to fit the groove and were not held therein under compression the fluid flowing through the line would unseat the gasket and displace it from its groove.

The clamp ring 5 is provided with radially extending lugs 16, 16 whose sides form impact faces by means of which the clamp ring may be driven fully home or released.

The drawing and description are illustrative merely while the broad principle of the invention will be defined by the appended claims.

What I claim is:

1. A union comprising aligned coupling members having abutting end faces, the abutting ends of said coupling members being provided one with an external annular flange and the other with external threads, a clamp ring having internal threads adapted to mesh with the external threads and having an inside flange adapted to abut said external flange when the clamp ring is screwed home, one of said members having an annular internal countersunk portion whose outer wall converges toward the other member and which is overhung by the abutting end of said other member thus forming an internal annular groove, an annular resilient gasket whose ends converge outwardly and whose outer side tapers from one end to the other end of said gasket, to conform to the taper of said outer wall, the inner side of said gasket being wider than the groove and having lips fitting against the end walls of the groove, said gasket being retained in and conformed to the shape of said groove by pressure when the coupling members are clamped together by said ring.

2. A union comprising aligned coupling members having abutting ends formed with plane faces which fit closely together, means for securing said ends together, the inner end of one coupling member being provided with an inside countersunk portion presenting a wall which is approximately parallel with the opposing end of the other coupling member and also presenting an outer wall which tapers or converges toward the inner end of said counter-sunk coupling member at approximately a ten degree angle to the axis of the union thus forming an inside annular groove, a gasket formed of yieldable material whose peripheral face is tapered relative to its axis so as to fit closely against the outer wall of the groove, said gasket having end faces which converge outwardly, the end face of the gasket adjacent said parallel wall of the groove converging outwardly at approximately a two degree angle and the other end face of the gasket converging outwardly at approximately a ten degree angle, to a plane perpendicular to the axis of the gasket, the inner side of the gasket being concave from one end face to the other end face of the gasket providing annular inwardly extended end lips, the inner side of the gasket being wider than the width of the groove in which it is designed to fit so that when the coupling members are fitted together, with the gasket in the groove, the gasket will conform its shape to the shape of the groove and will be held in the groove under compression with the lip portions fitting tightly against the opposing sides of the groove.

CRAWFORD K. STILLWAGON.